United States Patent
Gebhardt

(10) Patent No.: US 6,619,465 B1
(45) Date of Patent: Sep. 16, 2003

(54) POINTS FOR A FEEDING SYSTEM, ESPECIALLY A GRAVITY ROLLER TABLE

(75) Inventor: Günter Gebhardt, Wohnsits (DE)

(73) Assignee: Gebhardt Fördertechnik GmbH, Sinsheim (DE)

( * ) Notice: Subject to any disclaimer, the term of this patent is extended or adjusted under 35 U.S.C. 154(b) by 0 days.

(21) Appl. No.: 09/937,969

(22) PCT Filed: Mar. 31, 2000

(86) PCT No.: PCT/EP00/02892
§ 371 (c)(1),
(2), (4) Date: Jan. 7, 2002

(87) PCT Pub. No.: WO00/59811
PCT Pub. Date: Oct. 12, 2000

(30) Foreign Application Priority Data

Mar. 31, 1999 (DE) .......................................... 199 14 582
May 7, 1999 (DE) .......................................... 199 21 131

(51) Int. Cl.$^7$ ............................ B65G 13/10; B65G 47/54
(52) U.S. Cl. .............. 198/370.09; 198/361; 193/35 SS; 193/35 MD
(58) Field of Search ........................... 198/370.09, 361; 193/35 SS, 35 MD

(56) References Cited

U.S. PATENT DOCUMENTS

| 4,598,815 A | | 7/1986 | Adama |
| 4,746,003 A | | 5/1988 | Yu et al. |
| 5,029,693 A | * | 7/1991 | Williams ............... 198/370.09 |
| 5,971,133 A | * | 10/1999 | Wilkins ................. 198/370.09 |

FOREIGN PATENT DOCUMENTS

EP 0251391 1/1988

* cited by examiner

Primary Examiner—Christopher P. Ellis
Assistant Examiner—Mark A. Deuble
(74) Attorney, Agent, or Firm—Horst M. Kasper

(57) ABSTRACT

The invention relates to a switch for transport system, in particular for a gravity roller table, for deflecting of transport goods in a plane from a main conveyor to a lateral conveyor branching from the main conveyor, wherein the switch comprises a group of co-operating and in particular individually driven modules. Each module comprises a bearing block, a fork received in the bearing block rotatable around the vertical axis as well as a roller body, wherein the roller body is supported in the fork and rotatable around a horizontal axis and wherein the roller body co-forms the support for the transport goods. The switch can be transposed from the straight out position into the deflection post ion and vice versa by a corresponding swiveling of the forks and thereby also of the roller bodies, wherein the forks and therewith also the roller bodies are lifted by way of a lift mechanism into the deflection position relative to the straight out position. The lift mechanism becomes necessarily active by swiveling of the fork from the straight out position into the deflection position.

20 Claims, 15 Drawing Sheets

Figure 1:
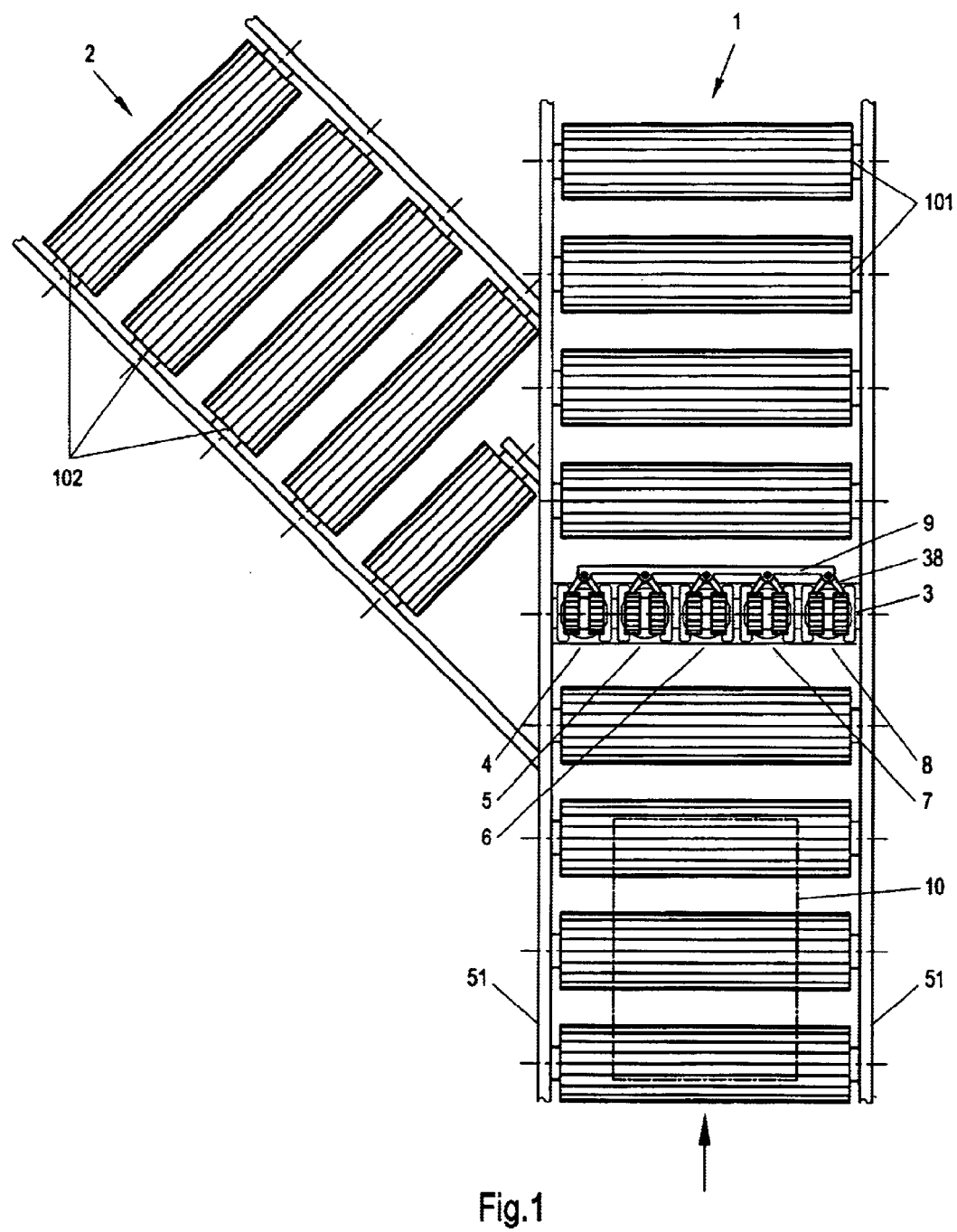

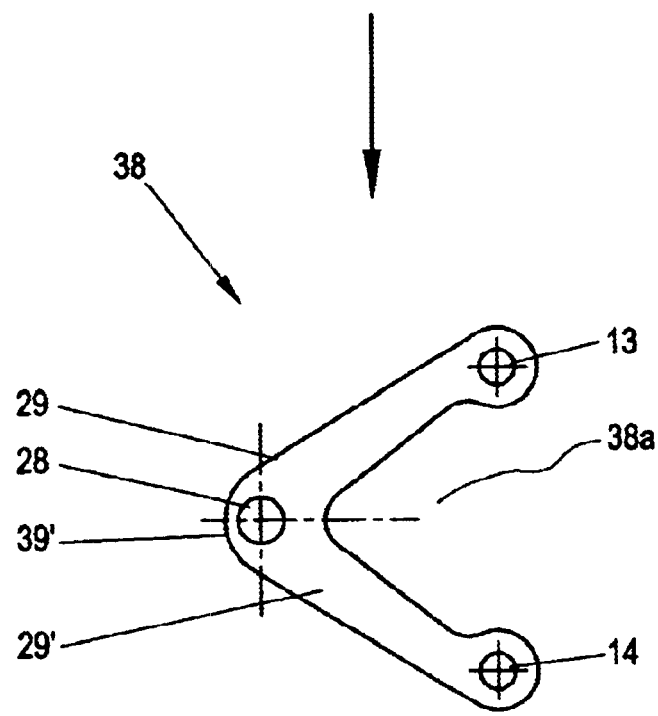
Fig.15
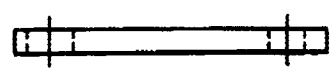
Fig.16

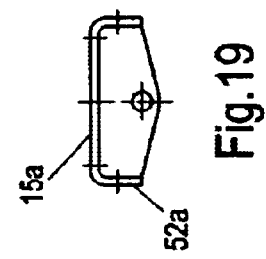
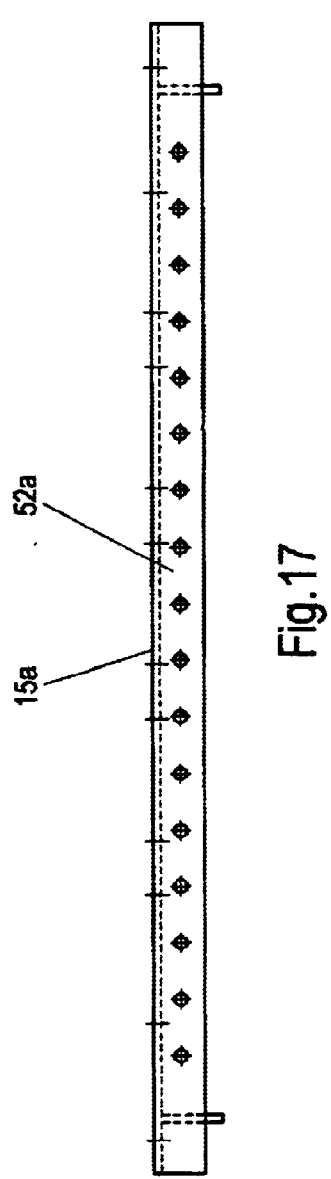
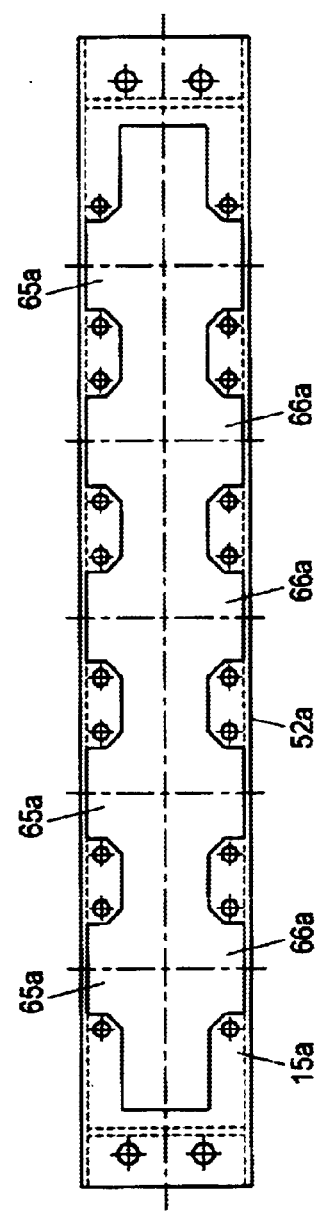

POINTS FOR A FEEDING SYSTEM, ESPECIALLY A GRAVITY ROLLER TABLE

TECHNICAL FIELD

The invention relates to a switch for a transport system, in particular for a gravity roller table, wherein the switch is susceptible between a straight position and a deflection position for deflecting of transport materials from a main conveyor to a side conveyor branching of the main conveyor.

STATE-OF-THE-ART

A transport device with a switch is known from the European patent application EP 0311699 A1, which transport device exhibits modules of roller bodies. The roller bodies here form a plane with the remaining transport rollers and can on the one hand form a linear transport unit together with the predisposed to transport rollers, on the other hand can be rotated by rotation around their own vertical axes relative to the linear transport unit. If the transport material is to be deflected to the branching lateral conveyor, then the roller bodies of the switch are turned corresponding to the outward transfer angle. In case transport materials with a large floor face are transported, then only a small part of the weight of the transport material is supported on the roller bodies of the switch, such that the deflection forces cannot prevail or cannot reliably prevail relative to the forces of the main conveyor operating in the transport direction. Either a failure of the switch or an uncontrolled rotation of the transport material can result therefrom, which in turn can lead to a back-up of the transport, in case the transport material cants at an unfavorable position of the roller track.

A transport device has become known from the European printed patent document EP-A-0251391 exhibiting a fork, where a roller body with a vertical rotation axis is supported in the fork. A vertically running bearing bolt is disposed at the fork wherein the bearing bolt is introduced into a bearing bush, such that the fork is rotatable around the axis of the bearing bolt. The front face of the bearing bush on the side of the fork exhibits at recess. The bearing bolt exhibits a horizontally projecting cross bolt below the fork, wherein the cross bolt carries a roller rotatable around the cross bolt, wherein the roller engages into the recess of the bearing bush upon a certain position of the fork such that the fork is lowered in this position and is lifted up of this position upon a rotation of the fork.

A deflection device for a transport band has become known from the U.S. Pat. No. 4,598,815 A, which comprises the series of driven swivelable rollers. The deflection device is furnished with a lift mechanism, wherein the lift mechanism can lift and lower the rollers, and a swivel mechanism synchronized with the lift mechanism, wherein the swivel mechanism swivels the rollers during each lift process into a deflection position and during each lowering process into a straight position.

It is an object of the present invention to furnish a good and reliably functioning switch for a transport system, wherein the switch can be produced cost favorable and wherein a retrofitting of existing transport systems with this switch is possible in a simple matter.

This object is obtained according to the present invention by a switch for a transport system in particular for a gravity roller table, wherein the switch is transposable between a straight position and a deflection position for deflecting of transport materials from a main conveyor to a lateral conveyor branching from the main conveyor, comprising a group of roller bodies with horizontally running rotation axes, wherein the roller bodies are disposed rotatable at in each case one fork around their rotation axes and wherein each fork exhibits a bearing bolt disposed projecting vertically downwardly from the fork, wherein the bearing bolt is introduced from the top into a vertically disposed bearing bush open on the top of a bearing block not participating in the swivel motion, such that the fork is the swivelable between a first position and a second position around the vertical swivel axis, wherein the switch is disposed in the straight out position in case the forks are in each case disposed in the first position, and wherein the switch is disposed in the deflection position when the forks in each case are disposed in the second position, wherein the forks are lifted such by a lift mechanism during the swiveling from the first position into the second position such that the transport materials during passage of the switch are lifted by at least one of the roller bodies at least partially relative to the transport system, characterized in that either the fork exhibits a head plate disposed in the upper end region of the bearing bolt and exhibiting recesses at the bottom side of the head plate and wherein the wall of the bearing bush (24) is limited on the top by an upper front face exhibiting projections, wherein the bearing bolt is introduced from the top into the bearing bush for a swivelable support of the fork around a vertical axis and wherein the lower side rests on the upper front face, wherein the projections and the recesses are disposed such that projections engage into the recesses into the first position of the fork and do not engage into the recesses in the second position of the fork such that the fork is disposed in a lifted position by the depth of the recesses or the height of the projections in the second position relative to the position of the fork in the first position, or the fork exhibits a head plate disposed in the upper end region of the bearing bolt, wherein the lower side of the head plate is planar and inclined relative to the horizontal, and wherein the wall of the bearing bush is limited on the top by a plane front face disposed inclined relative to the horizontal, wherein the bearing bolt is introduced into the bearing bush from the top relative to the support of the fork swivelable around a vertical axis and wherein the lower side rests on the upper front face, wherein the spatial position of the lower side and of the upper front face are such oriented relative to each other that the fork is disposed in the second position in the lifted position relative to the position of the fork in the first position, or the bearing block exhibits recesses and the fork exhibits a rotary plate with the projections, wherein the rotary plate rests on the upper front face of the bearing bush and wherein the projections engage the recesses in the first position of the fork and wherein the projections rest outside of the recesses on the bearing block in the second position of the fork such that fork is disposed in the lifted position in the second position relative to the position of the fork in the first position by the depth of the recesses or by the height of the projections.

The rotation axes of the roller bodies are disposed perpendicular to the longitudinal direction of the main conveyor in the straight out position of the switch according to the present invention, wherein the roller bodies are disposed preferably in the plane together with the remaining transport plane of the main conveyor and serve for the straight line transport of the transport material along the main conveyor.

However the rotation axes of the roller bodies run in the deflection position such that transport material is deflected on the lateral conveyor. The roller bodies are here lifted relative to their position in a straight out position of this switch according to the present invention and the roller bodies project upwardly above the remaining transport plane of the main conveyor according to the present invention such that the transport material is at least in part lifted upon passage of the switch, wherein advantageously an increased support forces generated between transport material and roller body relative to the straight out position and wherein thus deflection force of the roller bodies becomes effective in this position of the switch to an extended measure.

The result is a direction precise deflection of the transport material even in case of high transport speeds.

The forks with the roller bodies carried by the forks are brought into such lifted position projecting above the remaining transport plane by a lift mechanism, wherein the lift mechanism becomes effective during the changing of position of the switch from the straight out position into the deflection position. The lift motion of the forks required for this purpose is derived immediately from the swivel motion of the modules from the straight out position into the deflection position with the aid of the lift mechanism such that the lift motion is performed into the deflection position based on the swivel motion of the forks. The lift mechanism forming the basis here is advantageously very simple and is realizable with small constructive expenditures.

The fork exhibits a vertically disposed cylindrical bearing bolt. The swivelable support of the fork here is performed with the aid of a bearing block placed at the transport system, wherein the bearing block comprises a bearing bush with a horizontally running and on the top open cylindrical bore-hole and an attachment base, wherein the attachment base is connected to the bearing bush and serves for attachment of the bearing bush to the transport plant. The bearing bolt is received around its vertical axis in the bearing bush such that the fork and thereby also the roller body carried by the fork are supported swivelable around this axis.

The device group comprising the bearing block, the fork and the roller body is designated in the following as module.

An advantage of the described construction of the modules comprises a simple way of production and a thereby cost favorable production. A further advantage of the described construction of the modules comprises that the forks can be exchanged in a simple manner against such forks with other roller bodies. A retrofitting of the switch, for example to transport goods with the special properties such as for example of a particular high weight can be performed not only quickly and with little expenditure in this manner but the same switch with in each case suitable roller bodies can be employed for different transport systems if required, which equals to a building block principle.

Preferably a suitable adjustment device serves for changing the position of the switch according to the present invention between a straight out position and the deflection position. The adjustment device can be formed as an adjustment mechanism, which adjustment mechanism operates at the same time on several or all modules through a common coupling rod, wherein the coupling rod can be moved with the aid of an electrical, electromagnetic, pneumatic or hydraulic actuator or for example by a manually actuated drive.

Another possibility comprises to construct the switch such that the modules are individually adjustable by in each case a proper adjustment device, whereby there results as an additional advantage that the adjustment angle of the individual modules can be selected independent from each other if required and thus can be adapted to the special requirements or to special properties of changing kinds of transport goods.

The roller bodies do not exhibit their own drive and operate thereby as passive roller bodies in the transport system according to one embodiment of the invention. This embodiment can be suitable for example for transport systems, where the transport goods are moved at a high-speed on the transport systems or for such sections of transport systems, which are associated with a heavy drop in the transport direction.

The roller bodies exhibit their own drive and support thus actively the traction of the transport goods in particular for deflection onto the network conveyor according to another embodiment of the invention. Advantageously the roller body exhibits here a pulley, wherein the pulley is disposed recessed relative to the outer circumference of the roller body, such that the roller body can be driven by an endless drive belt, wherein the drive belt is disposed completely, including its outer circulating face, below the transport plane, and therefore does not come in contact with the transport goods. Several or all roller bodies can be driven here by a common drive shaft disposed below the transport planes through in each case a drive belt wherein the drive shaft is disposed below the modules and the support console and wherein the drive belts are led around the drive shaft.

According to a further embodiment of the invention the roller body is formed as a wheel rim, wherein the wheel rim carries at least one wheel tire operating as a running face for the transport goods. An advantage of such arrangement comprises that the wheel tire or, respectively, the wheel tires can be easily replaced in case of wear and can be exchanged easily for example against such with a different diameter for a different material or surface properties (for example wheel tires with rubber covering) if required.

Advantageously the modules can be disposed next to each other on a common support console, wherein the support console runs perpendicular to the transport direction of the main conveyor. It is advantageously achieved in this manner that a switch to be inserted into the transport system can be pre-mounted and preassembled at a suitable location, such that the mounting time for the insertion of the switch into the transfer system and thereby the for this purpose required stand still time of the transport plant becomes substantially reduced.

The invention cannot only be employed in connection with transport systems, wherein the transport systems are to outwardly transfer the transport goods, but also with such transport system wherein for example a widening, a reduction, a changing of the direction, or a parallel displacement of the transport stream is desired. The invention can also be employed in sorting plants. Complete fields of switches can be formed with the aid of the invention, wherein the advantage comprises that it is possible to react to differently large or, respectively, differently heavy transport goods without having to change expensively the transport system. The switch according to the present invention is functionally received in a transport combine.

Further advantageous embodiments of the invention are indicated in the sub claims.

Figure 2:
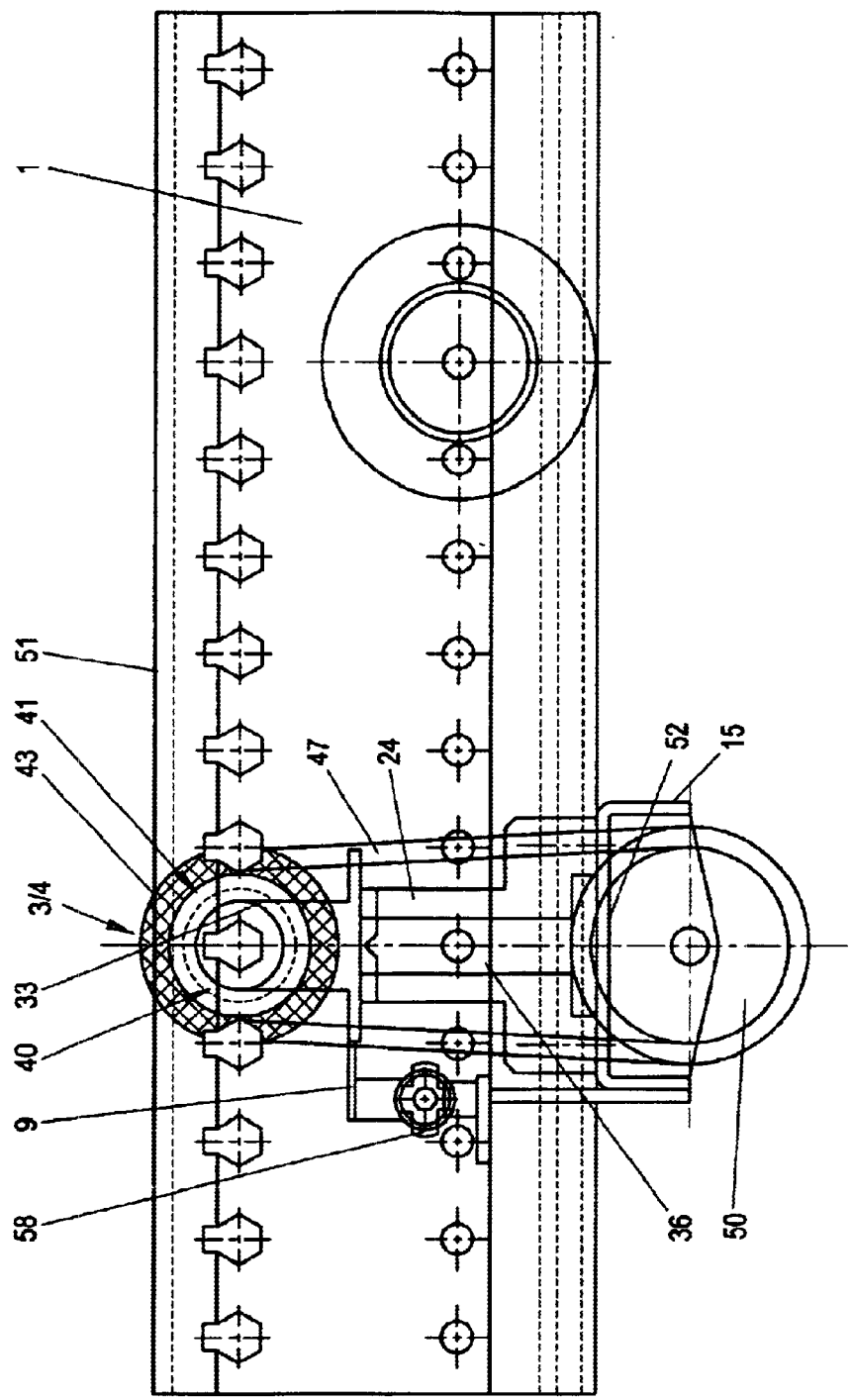
Figure 3A:
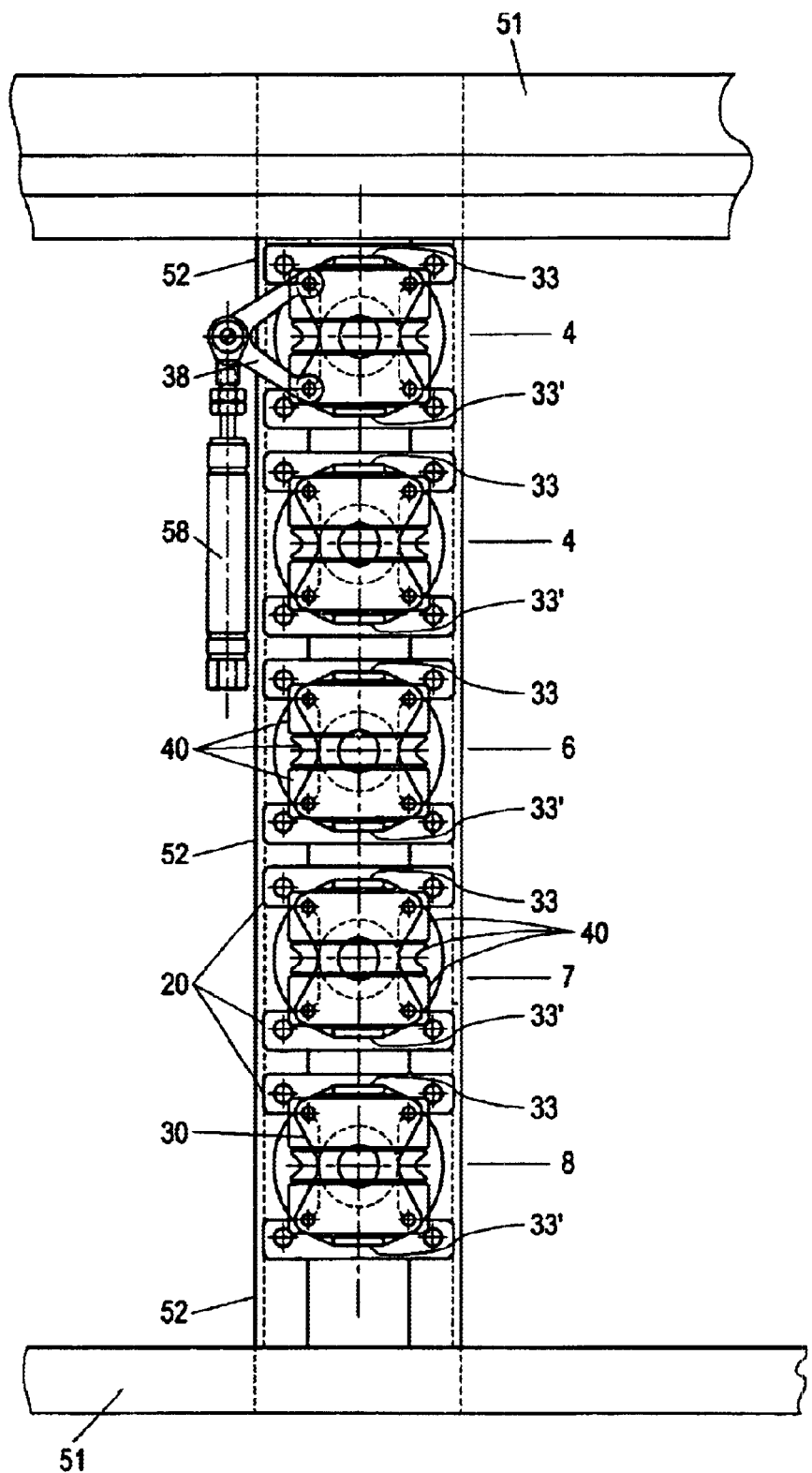
Figure 3B:
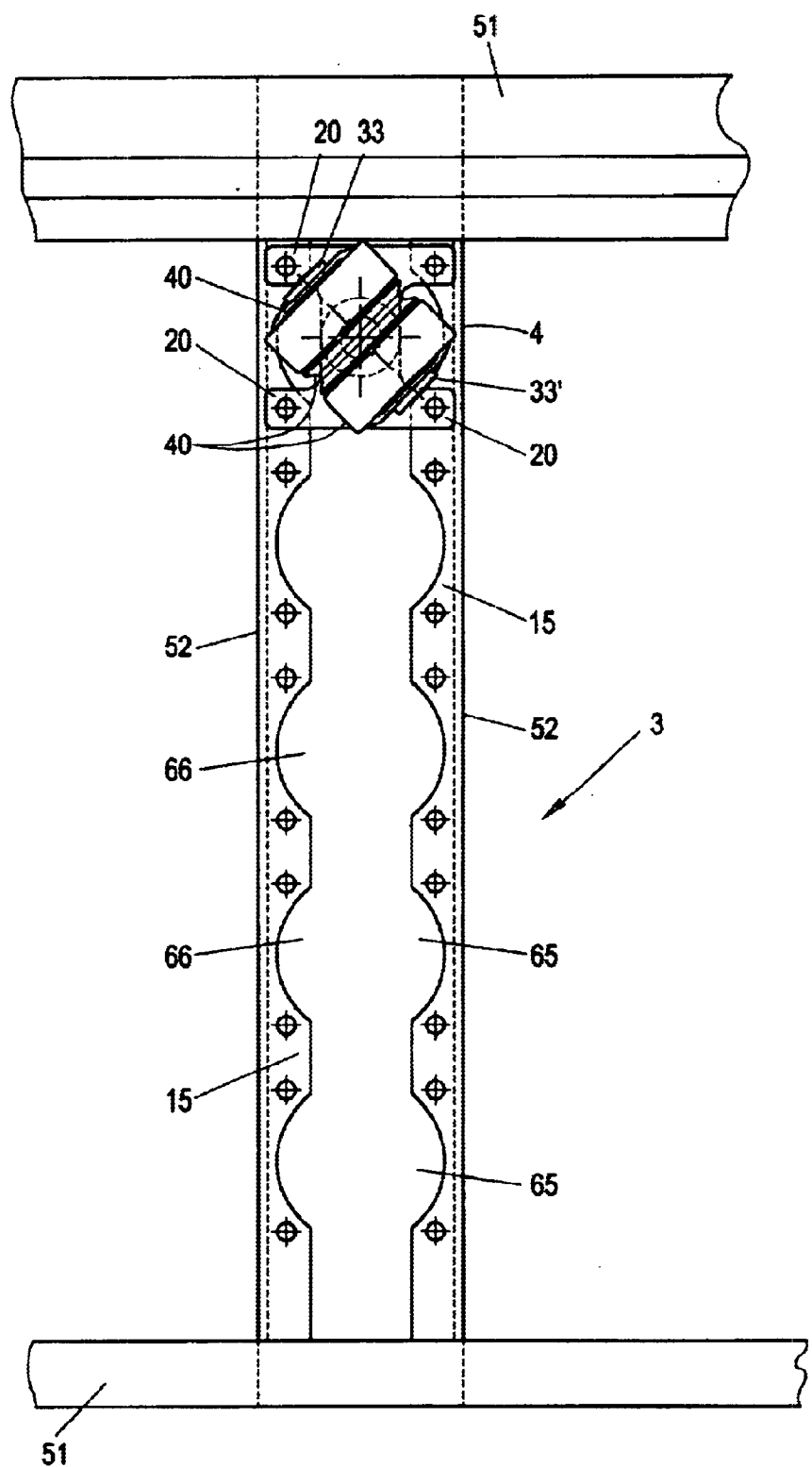
Figure 4:
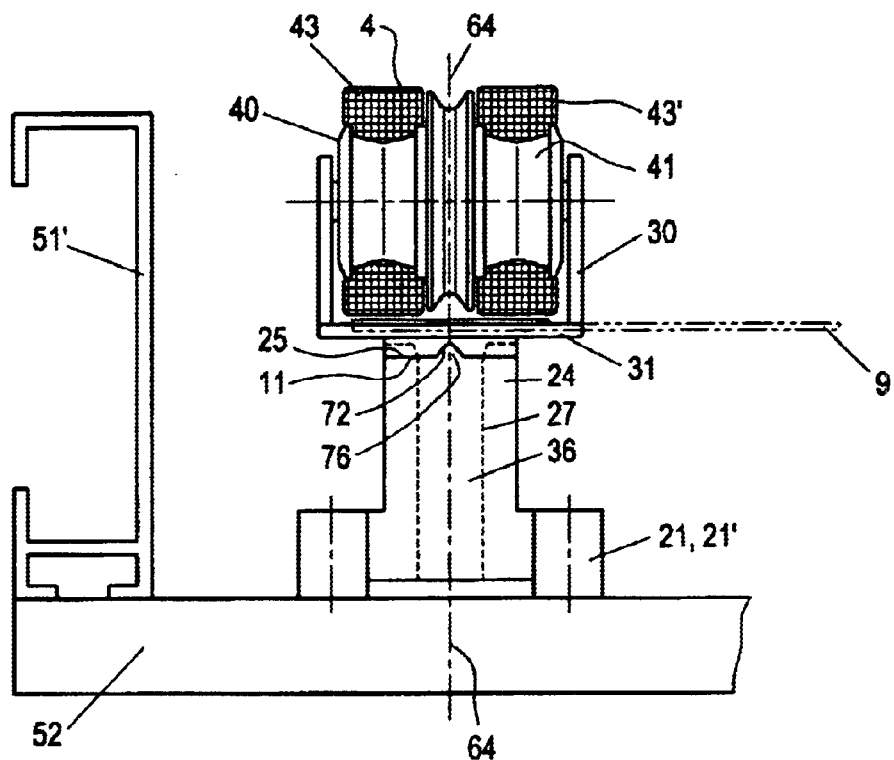
Figure 4A:
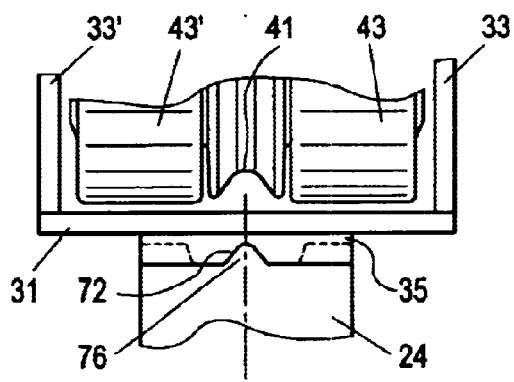
Figure 4B:
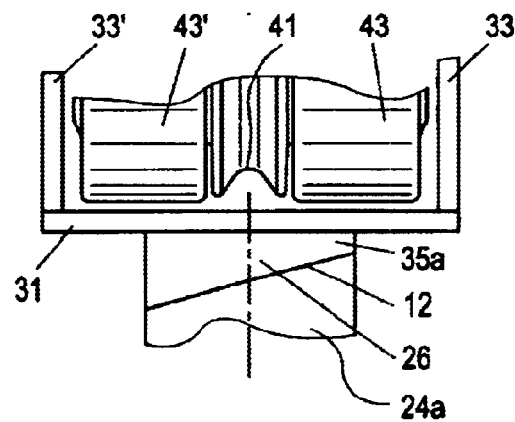
Figure 5:
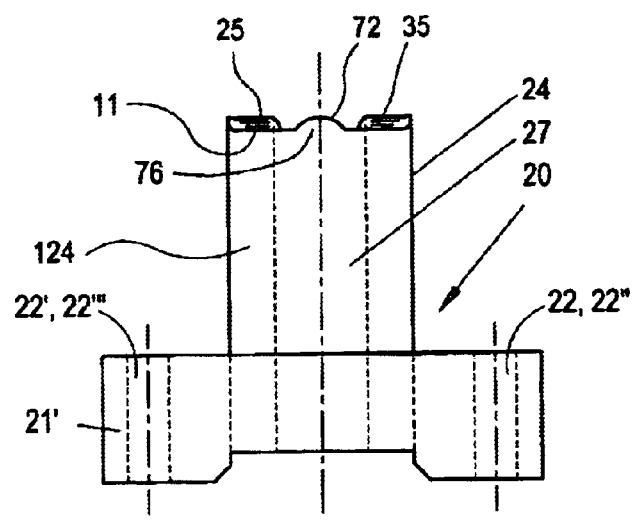
Figure 6:
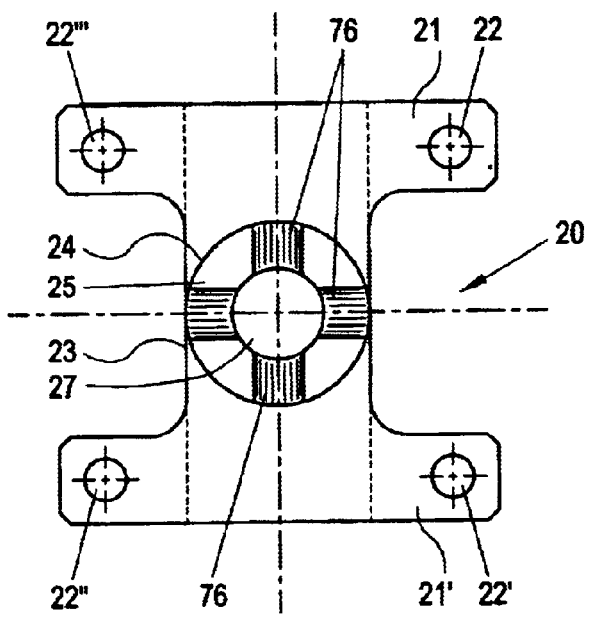
Figure 7:
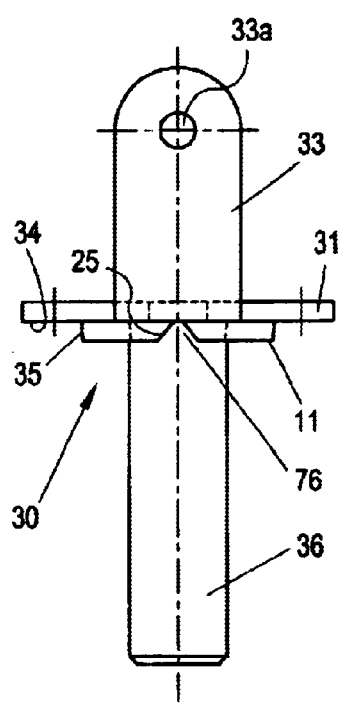
Figure 8:
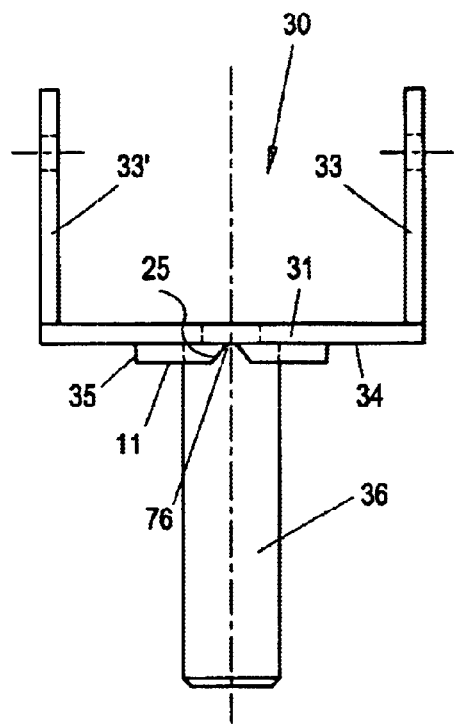
Figure 9:
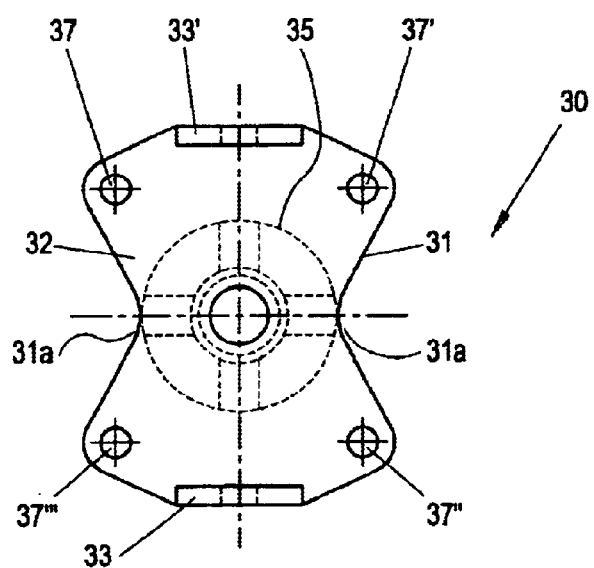
Figure 10:
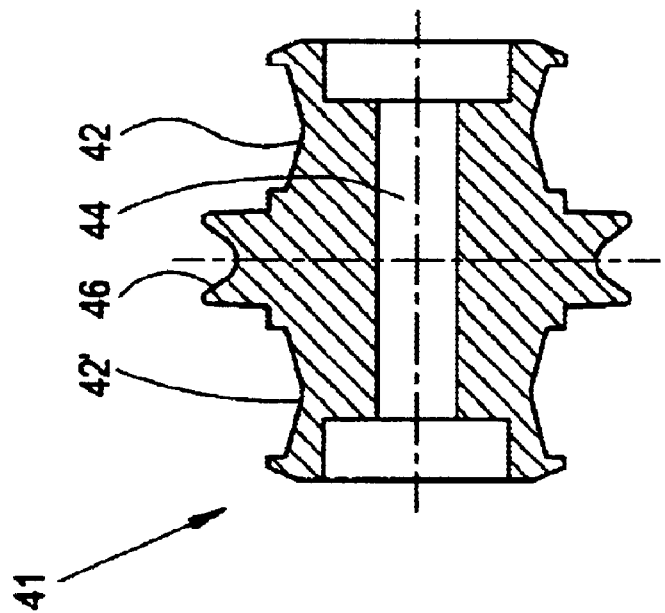
Figure 11:
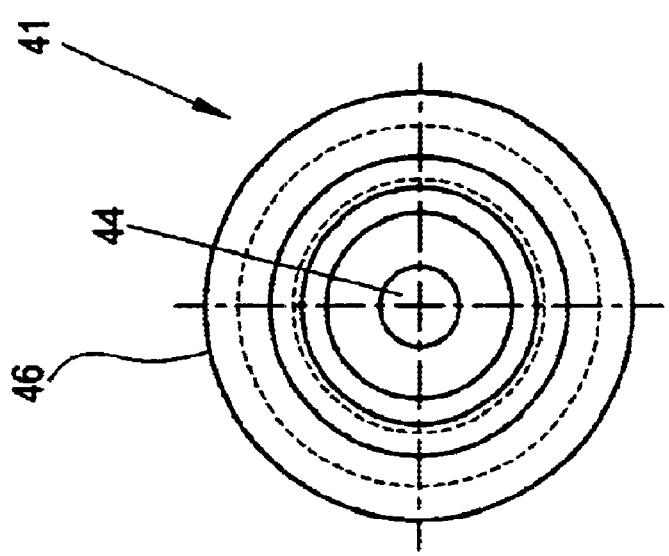
Figure 12:
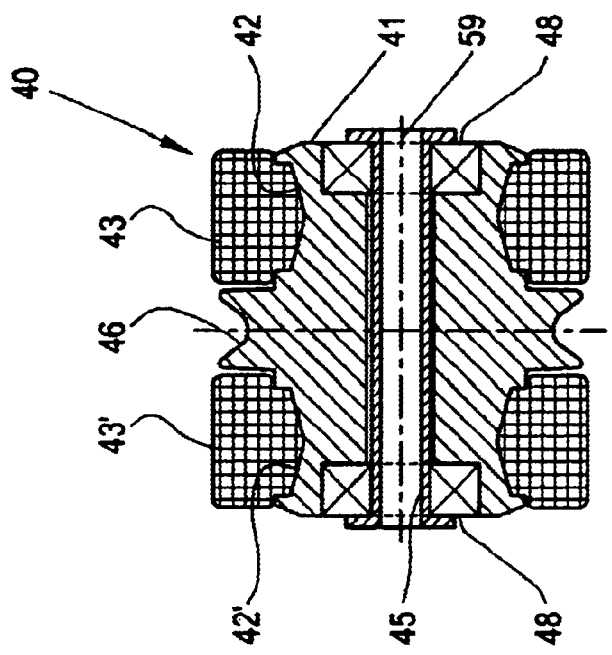
Figure 13:
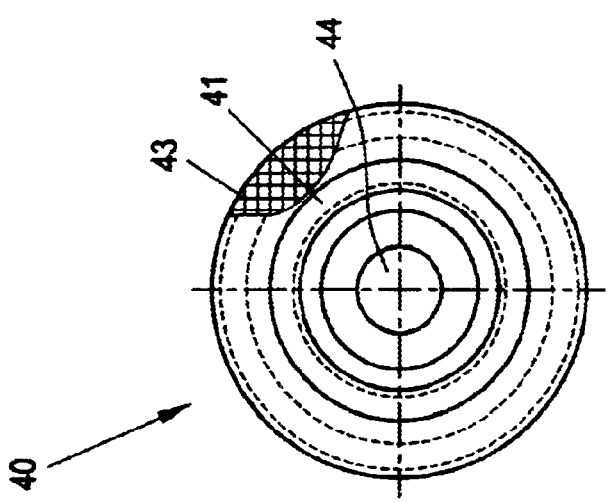
Figure 14:
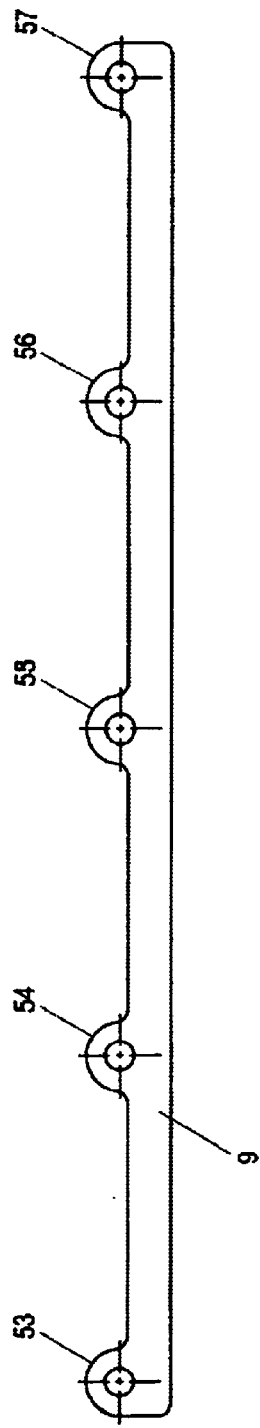
Figure 20:
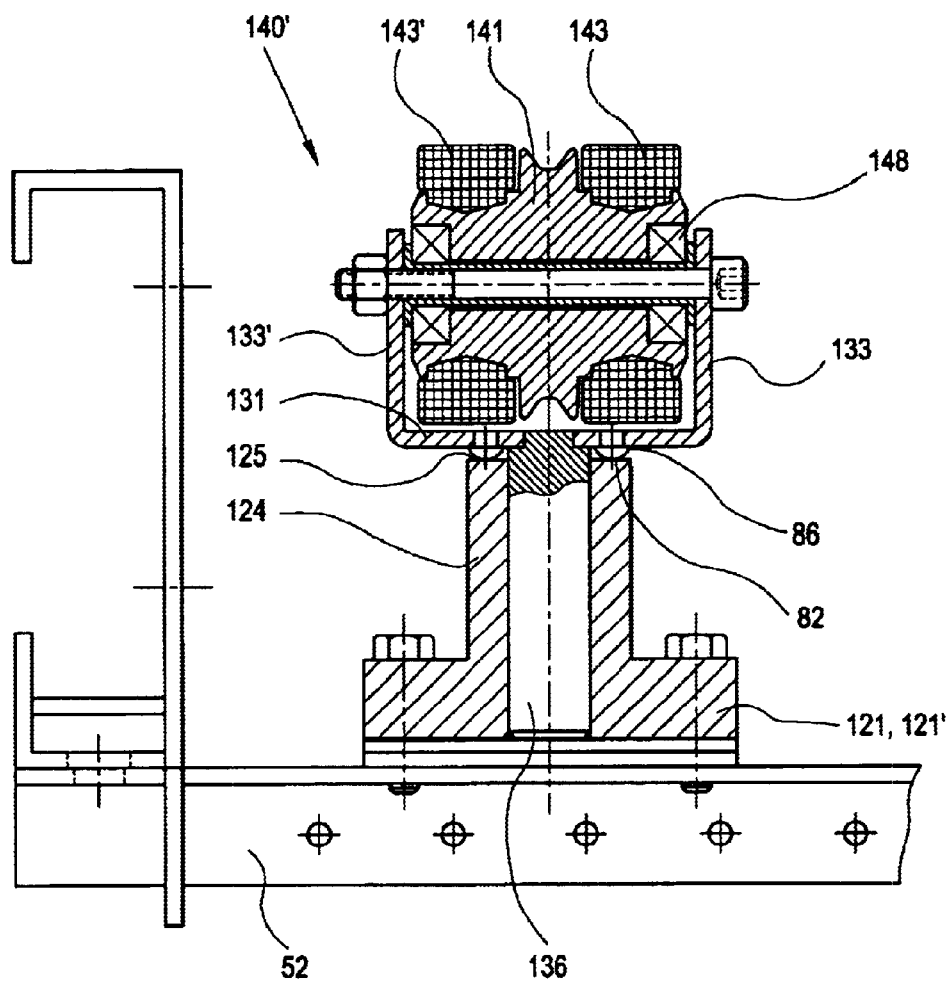
Figures 21, 22:
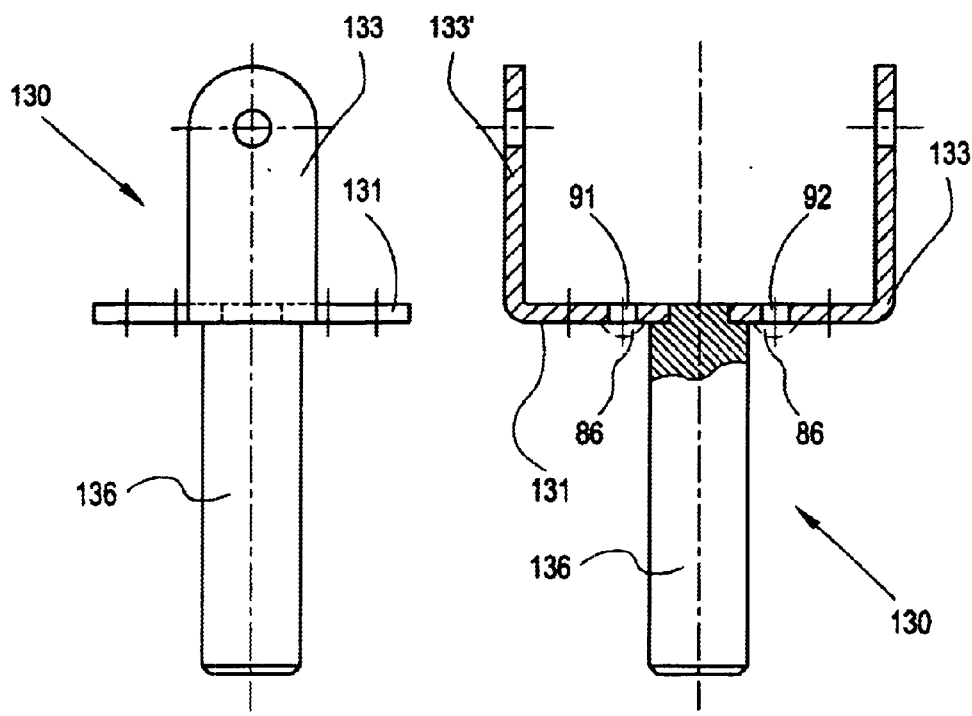
Figure 23:
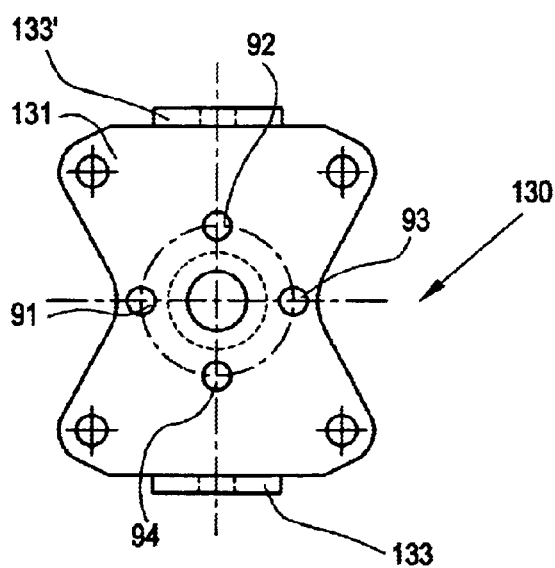
Figure 24:
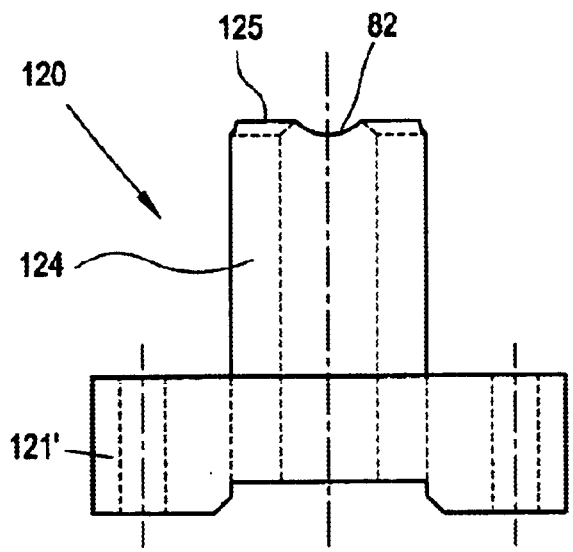
Figure 25:
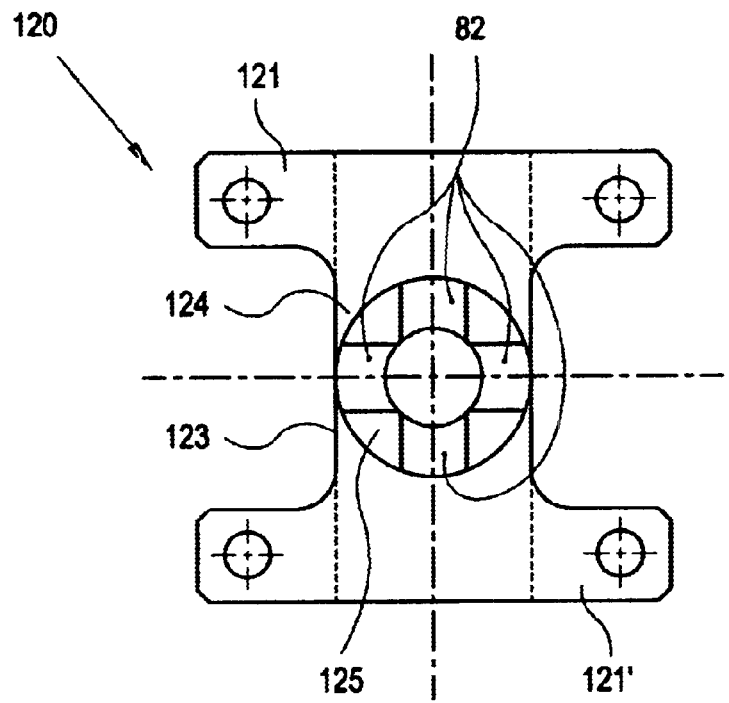

Various preferred embodiments of the invention are schematically illustrated in the drawings. There is shown:

FIG. 1 a schematic presentation of a main conveyor and of a lateral conveyor with a switch in a top view, FIG. 2 a side elevational view of a main conveyor in the region of a switch according to the present invention with belt driven roller bodies, FIG. 3a a top plan view onto a main conveyor in the region of a switch according to the present invention disposed in straight out position, wherein the cylinders of the main conveyor as well as the lateral conveyor and the coupling rod are dispensed with, FIG. 3b a top plan view onto the main conveyor of FIG. 3a, wherein a module is disposed in a deflection position, wherein the other modules as well as the lever and the pneumatic cylinder of FIG. 3a are dispensed with, FIG. 4 a side elevational view of a preferred embodiment of a module, FIG. 4a an enlarged representation of the lower fork region of the module of FIG. 4, FIG. 4b an enlarged representation of the lower fork region of another embodiment of a module, FIG. 5 a side elevational view of a preferred embodiment of a bearing block with view direction perpendicular to the longitudinal direction of the main conveyor of FIG. 1, FIG. 6 a top plan view onto the bearing block, FIG. 7 a front elevational view of the fork of the module of FIG. 4, FIG. 8 a side elevational view of the fork of FIG. 7, FIG. 9 a top plan view onto the fork of FIG. 7, FIG. 10 a cross-sectional presentation of the wheel rim of a module without wheel tires, FIG. 11 a front elevational view of the wheel rim of FIG. 10, FIG. 12 a cross-sectional view of a complete roller body of a module, FIG. 13 a front elevational view of the roller body of FIG. 12, FIG. 14 a coupling rod for mechanical coupling of the rotation of several modules, FIG. 15 a top plan view onto a lever for a hinged connection of the fork with the coupling rod, FIG. 16 a side elevational view of the lever from the direction designated in FIG. 15 with 'A', FIG. 17 a side elevational view of a support console for mechanical receiving of several modules with the direction of view in the longitudinal direction of the main conveyor of FIG. 1, FIG. 18 a top plan view onto the support console of FIG. 17, FIG. 19 a front elevational view of the support console of FIG. 17, FIG. 20 a cross-sectional representation of a module with a further embodiment of lift agents, FIG. 21 a front elevational view of a fork of the module of FIG. 20, FIG. 22 a side elevational view of the fork of FIG. 21, FIG. 23 a top plan view onto the fork of FIG. 21, FIG. 24 a side elevational view of a further embodiment of a bearing block with view their action perpendicular to the longitudinal direction of the main conveyor of FIG. 1, and FIG. 25 a top plan view onto the bearing block of FIG. 24.

FIG. 1 shows a schematic top plan view onto a main conveyor 1, wherein the main conveyor 1 exhibits a plurality of main conveyor rollers or cylinders 101, and onto the lateral conveyor 2, wherein the lateral conveyor 2 exhibits a plurality of lateral conveyor rollers or cylinders 102. FIG. 1 shows furthermore a preferred embodiment in a straight out position of a switch 3 according to the present invention. The lateral conveyor 2 branches from the main conveyor 1 in the region of the switch 3 according to the present invention. The lateral conveyor 2 can be fed with transport goods 10 (shown with dashed lines in FIG. 1) with the aid of the switch 3, wherein the transport goods 10 pass into the region of the switch 3 to the main conveyor in the direction of the arrow of FIG. 1. The switch 3 according to the present invention can be transposed between the straight out position and a deflection position as required. Transport goods 10 are outwardly transferred onto the lateral conveyor in case the switch 3 is disposed in deflection position.

The embodiment of a switch 3 according to the present invention shown in FIG. 1 comprises a group of five modules 4, 5, 6, 7, 8, disposed parallel next to each other, of which modules 4, 5, 6, 7, 8 each comprises a bearing block 20 (FIGS. 5–6, FIGS. 24–25), a fork 30 (FIGS. 7–9, FIG. 21–23) and a roller body 40 (FIGS. 10 through 13) rotatably supported with the aid of the fork 30. The construction and the functioning of the modules 4, 5, 6, 7, 8 are explained in more detailed by way of several embodiments in the following.

The transposition of the switch 3 between the straight out position shown in FIG. 1 and the deflection position is performed with the aid of levers 38 (explained in more detail with reference to FIGS. 15–16) and a coupling rod 9 (explained in more detailed with reference to FIG. 14) according to a preferred embodiment of the invention. The main conveyor 1 is enclosed on the side by cheeks 51, 51', wherein the cheeks 51, 51' protect the transport goods 10 against falling down on the side.

Existing transport plants can be retrofitted with a switch 3 according to the present invention under relatively small expenditure. The cheeks 51, 51' advantageously do not need to be interrupted or separated for such a retrofitting.

FIG. 3a s s an enlarged and more detailed presentation of the switch 3 relative to FIG. 1, wherein the coupling rod 9, the lateral conveyor 2, and the rollers or cylinders 101 of the main conveyor 1 are dispensed with for reasons of viewability. The roller body 40 explained in more detail with reference to FIGS. 10 through 13 are transparently shown in the drawing of FIG. 3a. Each fork 30 (FIG. 7–9) exhibits two bearing arms 33, 33' (FIG. 3a), wherein a roller body 40 is rotatably supported between the two bearing arms 33,33'. The modules 4, 5, 6, 7, 8 are supported by a support console 52 running perpendicular to the longitudinal direction of the main conveyor.

As was mentioned already with reference to FIG. 1, according to a preferred embodiment of the invention a lever 38 is disposed at each fork 30, wherein only the lever 38 disposed at the module 4 is shown in FIG. 3 for reasons of viewability and wherein the remaining levers are dispensed with. All levers 38 are connected hingedly to the coupling rod 9 (not illustrated in FIG. 3a) such that the swivel motions of the forks 30 are mechanically coupled occurring upon transposing of the switch 3 from the straight out position into the deflection position and vice versa.

According to a preferred embodiment of the invention, FIG. 3a shows further a pneumatic cylinder 58 serving as an actuator for the switch 3, wherein the coupling rod 9 (in FIG. 3a not shown) can be moved in each case in the longitudinal direction of the coupling rod 9 for transposing the switch from the straight out position into the deflection position and vice versa with the aid of the pneumatic cylinder 58.

The switch 3 of FIG. 3a is shown in FIG. 3b, where only a module 4 is shown, wherein the fork 30 of the module 4 is disposed in deflection position, while the remaining modules 5, 6, 7, 8 as well as the levers 38 and the pneumatic cylinder 58 are dispensed with for reasons of viewability. The position of the bearing arms 33, 33' as well as the orientation of the roller body 40 is changed relative to FIG. 3a based on the deflection position of the fork 30. The support console 52 exhibits at its upper side an interrupted web 15, wherein the web 15 is furnished with a pair of circle section shaped recesses 65, 66 disposed opposite to each other in longitudinal direction of the main conveyor 1 (FIG. 1) in the region of each module 4, 5, 6, 7, 8 (FIG. 1, FIG. 3a), wherein the functioning of the recesses 65, 66 is explained with reference to FIG. 2.

Reference is now made to FIG. 17 through 19. FIG. 17 shows a side elevational view, FIG. 18 shows a top planar view, and FIG. 19 shows a front elevational view of another embodiment 52a of the support console, wherein the recesses 65a, 66a are essentially limited by straight lines in the support console. The cross-sectional shape of the support console 52a is essentially U-shaped (FIG. 19), wherein the horizontal part is formed by an interrupted and broken through web 15a.

Reference is now made to FIGS. 15–16, wherein the lever 38 is illustrated in a top view (FIG. 15) and in a side elevational view (FIG. 16) from the direction characterized by an arrow in FIG. 15 in more details in FIGS. 15–16. The lever 38 has essentially the shape of an equal arm triangle, wherein the face exhibits a recess 38a in the region of the side of the triangle disposed opposite to be apex region 39 of the triangle, such that the remaining face is formed by two spread apart arms 29, 29, wherein the spread apart arms 29, 29' meet in the apex region 39 of the triangle. The lever 38 is furnished with a bore-hole 13, 13' in each case in the region of the ends of the arms 29, 29' and with a hinge bore hole 28 in the apex region 39.

Reference is made now to FIGS. 4–9. FIG. 4 shows a side elevational view of a preferred embodiment of a module 4, 5, 6, 7, 8. As already mentioned a preferred embodiment of a module 4, 5, 6, 7, 8 comprises a bearing block 20 (FIGS. 5 to 6) with a vertically disposed bearing bush 24, a fork 30 (FIG. 7–9) with two bearing arms 33, 33' rotatably supported around a vertical axis 64 in the bearing bush 24 with the aid of the bearing bolt 36, as well as a roller body 40 (FIGS. 10–13) rotatably supported around its horizontally axis between the bearing arms 33, 33'.

The roller body 40 comprises according to a preferred embodiment a wheel rim 41 as well as two wheel tires 43, 43' surrounding the wheel rim 41 tire-like, wherein the wheel tires 43, 43' are shown in cross section in FIG. 4 for reasons of a better understanding.

A preferred embodiment of the bearing block 20 is shown in more detail in FIGS. 5 and 6. The bearing block 20 has an H-shaped attachment base 21, 21 ' as seen in the top view (FIG. 6), wherein the attachment base 21, 21 ' is penetrated with vertical screw holes 22, 22', 22", 22'". The attachment base 21, 21' supports the vertically aligned bearing bush 24 on a cross web 23, wherein the bearing bush 24 exhibits essentially the shape of a hollow cylinder and serves (FIG. 4) for the rotatable reception of the bearing bolt 36 of the fork 40 around the vertical axis 64 of the bearing bolt. The wall of the bearing bush 24 exhibits preferably four radially running elongated projections 76 (FIG. 5, FIG. 6) disposed preferably by in each case by 90 degrees relatively staggered relative to the axis of the bearing bush 24 at the upper front side 25 of the wall of the bearing bush 24, wherein the elongated projections 76 can have the shape of prisms rounded at the back.

The function of the projections 76 is further explained in the following. A head plate 35 is laying on the upper front side 25 of the wall of the bearing bush 24, wherein the head plate 35 is attached to the fork 30 and wherein the functioning of the head plate 35 is also further explained in the following.

A preferred embodiment of the fork 30 is shown in more detail in FIG. 7–9. FIG. 8 shows a side elevational view and FIG. 9 a further side elevational view rotated by 90 degrees relative to FIG. 8 of the fork 30, whereas FIG. 9 shows a top plan view onto the fork 30. The fork 30 comprises a horizontal rotary plate 31, two bearing arms 33, 33' disposed opposite to each other at the rotary plate 31, the cylindrical bearing bolt 36 disposed under the rotary plate centered and vertically, and the head plate 35.

The rotary plate 31 has a butterfly like shape (FIG. 9). The form of the rotary plate 31 can also be described essentially as a rectangle, wherein the corners are beveled and wherein the longitudinal sides of the rectangle exhibit symmetrical, essentially triangular recesses 31a, wherein the function of the recesses 31a is further explained in the following. The bearing arms 33, 33' are disposed vertically upwardly projecting from the rotary plate 31 at the narrow sides of the recited rectangle recessed at its longitudinal sides and are disposed parallel relative to each other. The bearing arms 33, 33' exhibit in each case a bore hole 33a in about the same height. The axes of the bore holes 33a of the two bearing arms 33, 33' are aligned relative to each other and serve for receiving the bearing shaft of the roller body 40 already shown in FIG. 4 and to be explained further in the following.

The orientation of the fork 30 in case of straight out position or, respectively, in case of a deflection position of the switch 3 can be gathered from the position of the bearing arms 33, 33' in FIG. 3a and in FIG. 3b.

The rotary plate 31 has four bore holes 37, 37', 37", 37'" disposed at the corner points of a square, wherein the bore holes 37, 37', 37", 37'" serve for attachment of the lever 38 (FIGS. 15–16). The distance of the bore holes 37, 37', 37", 37'" corresponds to the distance between the bore holes 13, 14 in the arms 29, 29' of the lever 38. The lever 38 not shown in FIG. 7–9 is disposed such that the apex region. 39 of the lever 38 is disposed remote relative to the rotary plate 31 and wherein the two bore holes 13, 14 in the arms 29, 29' of the lever 38 are congruent with two bore holes 37, 37' or 37', 37" or 37", 37'" or 37'", 37 of the rotary plate 31. The lever 38 and the rotary plate 31 are attached to each other with the aid of the bore holes 13, 14 of the lever and the bore holes 37, 37', 37", 37'" of the rotary plate 31.

The square disposition of the bore holes 37, 37', 37", 37'" in the rotary plate is intentionally selected in order to be able to select between four possible dispositions for the lever 38 at the rotary plate 31 according to different embodiments of the actuator for the forks 30 of the switch 3 (FIG. 1). According to a preferred embodiment each fork 30 is connected to the coupling rod 9 through its own lever 38 as illustrated in FIG. 1. The actuating motion of the coupling rod 9 for transposing the switch 3 perpendicular to the longitudinal direction of the main conveyor 1 (FIG. 1) is performed according to this embodiment. The levers 38 are disposed such at the rotary plate 31 that the activating motion for transposing the switch 3 is performed in the longitudinal direction of the main conveyor 1 according to another embodiment, which embodiment can be advantageous in case of a lack of space in the perpendicular direction of the main conveyor.

According to a further embodiment the transposition of the switch 3 is performed by separate levers 38 for each fork 30 and two coupling rods 9, wherein the second lever 38 in each case is disposed on the side of the rotary plate 31 disposed opposite to the first lever 38. In this case for example the transposition of the switch 3 in deflection direction can be performed by a first drive and by the first coupling rod and the return setting into straight out position can be performed by a second drive and the second coupling rod.

A preferred embodiment of the coupling rod 9 is illustrated in FIG. 14. The coupling rod 9 exhibits articulated brackets 53, 54, 55, 56, 57 in this embodiment, wherein a hinged connection with a rotary plate 31 is produced over the articulated brackets 53, 54, 55, 56, 57 together with in each case a hinged bore hole 28 of a lever 38. The lever 38 is connected to the coupling rod 9 through the hinged bore hole 28 of the lever 38.

The bearing bolt 36 (FIG. 7, FIG. 8) serves for the rotatable support of the fork 30 in the bearing bush 24 of the bearing block 20 (FIGS. 4–6). The head plate 35 already mentioned in reference to FIG. 5 exhibits an annular shape and is attached concentrically to the bearing bolt 36 at the bottom side 34 of the rotary plate 31 according to a preferred embodiment. The bottom side 11 of the head plate 35 exhibits preferably four groove shaped recesses 72 (FIG. 7, FIG. 8) running radially and disposed staggered relative to each other by in each case preferably 90 degrees relative to the axis of the bearing bolt 36 according to a preferred embodiment, wherein the groove shaped recesses 72 correspond spatially to the projections 76 of the upper front face 25 of the wall of the bearing bush 24.

The orientation of the head plate 35 relative to the fork 30 is selected such that the projection of each recess 72 of the lower side 11 of the head plate 35 congruently coincides (FIG. 5, FIG. 6) with the projection of in each case one of the projections 76 of the upper front side 25 of the wall of the bearing bush 24, while the fork 30 is disposed in straight out position as illustrated in FIG. 1 and FIG. 3a. In this case each of the projections 76 engages into a recess 72, wherein the head plate 35 rests with its lower side plane on the upper front side 25 of the wall of the bearing bush 24. This situation is illustrated in FIG. 4a, which FIG. 4a shows an enlarged representation of the head plate 35, of the upper part of the bearing bush 24 as well as the lower part of the fork 30 and of the roller body 40 and furthermore a projection 76 engaging into a recess 72 relative to FIG. 4.

If however the fork 30 is disposed in deflection position (FIG. 3b), the branded projections of the recesses 72 and of the projections 76 do not coincide. In this case the projections 76 do not engage into the recesses 72. The head plate 35 therefore lies with its lower side not plane on top of the upper front side 25 of the wall of the bearing bush 24, but the bottom side of the head plate 35 rides on the back or peak of the projections 76, such that the complete fork 30 and thereby also the roller body 40 carried by the fork 30 is lifted up in the deflection position by the height of the projections 76 relative to the straight position according to the present invention.

The projections 76 and the recesses 72 therefore form a lift mechanism according to the present invention, wherein the lift mechanism becomes necessarily effective by the swiveling of the fork 30 relative to the bearing block 20 from the straight out position into the deflection position.

The embodiment of a lift mechanism shown in FIGS. 4, 4a and in FIGS. 5–9 operates such that the fork 30 is not in a lifted state in case of a rotation of zero degrees, 90 degrees, 180 degrees, and 270 degrees relative to the straight out position however at all intermediately disposed angles the fork 30 is disposed in a lifted up state. The lifting occurs here both by the left rotation as well a right rotation of the head plate 35 from the straight out position of the fork 30.

According to another embodiment of a lift mechanism (not shown), the recesses 72 are formed in the head plate 35 and the projections 76 are formed on the upper front face 25 of the bearing bush 24. The principle of operation is analog to the lift mechanism operating principle illustrated with reference to the FIGS. 4, 4a and the FIGS. 5–9.

A further embodiment of the lift mechanism is shown in FIG. 4b, wherein the head plate 35a and the bearing bush 24a co-operates. The head plate 35 exhibits in this embodiment the shape of a vertical hollow cylinder cut at an inclined angle at the bottom side, while the bearing bush 24a exhibits the shape of a vertical hollow cylinder cut at an inclined angle at the upper side. The inclined front sides of the walls of the head plate 35a or, respectively, the bearing bush 24a thus show in this embodiment in each case inclined run-on tracks 26, 12. The run-on tracks 26,12 are resting completely at each other in the position illustrated in FIG. 4b such that the fork 30 is not present in a lifted position. The mutual orientation of the head plate 35a or, respectively, of the bearing bush 24a is thereby selected in such a way that the not lifted position illustrated in FIG. 4 corresponds to the straight out position of the fork 30. Each rotation of the fork 30 from this position leads to a necessary lifting of the fork 30 relative to the bearing bush 24a, wherein the lift stroke increases up to a rotary angle of 180 degrees relative to the position illustrated in FIG. 4b and then again becomes smaller. The lift stroke here is effected both by a left rotation as well as a right rotation of the head plate 35a from the straight out position of the fork 30.

The roller body 40 comprises in a preferred embodiment a wheel rim 41 as well as two wheel tires 43, 43' surrounding like a tire the wheel rim 41 and is received rotatable around its horizontal axes 59 (FIG. 4, FIG. 12) between the bearing arms 33, 33' of the fork 30. The roller body 40 is further explained in the following with reference to the FIGS. 10–13 by way of a preferred embodiment.

FIG. 10 shows a cross-sectional view and FIG. 11 shows a front elevational view of a preferred embodiment of a wheel rim 41 of a roller body 40 without wheel tires, wherein the sectional plane is disposed parallel to the axis of the wheel rim. The wheel rim 41 exhibits a hub bore hole 44 for receiving of a bearing shaft 45 (FIG. 12). The wheel rim 41 exhibits a double wheel rim bed 42, 42' for receiving of the wheel tires 43, 43' (FIG. 4).

A pulley 46 is formed between the wheel rim beds 42, 42', wherein the drive belt 47 can be led around the pulley 46 for driving a rotation of the roller body 40. Advantageously the pulley 46 is disposed recessed relative to the outer circumference of the wheel tires 43, 43' such that the roller body 40 can be driven by an endless drive belt 47 (FIG. 2), wherein the endless drive belt 47 is disposed completely, including its lower running face, below the transport plane, therefore the endless drive belt 47 does not come into touch with the transport goods 10 (FIG. 1). Several or all roller bodies 40 of the switch 3 can be driven through a common drive shaft 9 (FIG. 2) disposed below the transport planes through in each case one drive belt 47.

FIG. 12 shows a cross-sectional view and FIG. 13 shows a front elevational view of a complete roller body 40 comprising the wheel rim 41 of FIG. 10, two wheel tires 43, 43' as well as a bearing shaft 45, wherein the bearing shaft 45 is supported in the hub bore hole 44 by way of ball bearings 48 and wherein the bearing shaft 45 serves for a rotatable support of the roller body 40 between the bearing arms 33, 33' of the fork 30, 130.

The apexes of the wheel tires 43, 43' are preferably disposed in straight out position of the switch 3 (FIG. 1) in a plane with the cylinders 101 of the main conveyor 1. If the switch 3 is to be transposed into the deflection position, then the pneumatic cylinder 58 (FIG. 3a) is activated according to an embodiment of invention, wherein the pneumatic cylinder 58 exerts an actuating motion on the coupling rod 9. This effects a groupwise swiveling of the fork 30, 130 into the deflection position, wherein a lift mechanism becomes effective according to the invention, as was explained above in connection with FIG. 4a and FIG. 4b.

Reference is now made to FIG. 2, wherein FIG. 2 shows a front elevational view of the modules 4, 5, 6, 7, 8 of FIG. 4 with a driven roller body 40 in a main conveyor 1 drawn transparent for better understanding from a direction perpendicular to the main conveyor 1. The roller body 40, the bearing arm 33 of the fork 30 as well as the bearing block 20 are shown transparent also in FIG. 2. A rotating drive shaft 50 extending parallel to the support console 52 is disposed below the modules 4, 5, 6, 7, 8 supported by the support console 52, wherein a drive belt 47 is led around the drive shaft 50. The drive belt 47 is furthermore led around the pulley 46 disposed recessed relative to the outer face of the wheel tire 43 and transfers in this section the rotary motion of the drive shaft 50 to the roller body 40. The drive belt 47 is advantageously led through the intermediate space between the outer plate 31 and the lever 38 on the one hand and the recesses 65, 66, 67, 68, 69 of the web 15 of the support console 52 on the other hand based on the recess 31a of the rotary plate 31 and the recess 38a of the lever 38. An advantage which is thereby achieved comprises that the roller body 40 can be driven by the same drive units as the remaining rollers 101 of the main conveyor without that the construction height or the construction depth of the switch 3 enlarge thereby substantially. The drive shaft 58 can simultaneously drive more or all roller bodies 40 of the switch 3 through in each case one drive belt 47. The actuating motions of the fork 30 from the straight out position into the deflecting position and vice versa are driven by the pneumatic cylinder 58 operating as an actuator drive and are transferred to the fork 30 through the coupling rod 9 and the lever 38.

Reference is now made to FIGS. 20–25 for the illustration of a further embodiment of lift mechanism.

FIG. 20 shows a cross-sectional view of a further embodiment of a module 104, 105, 106, 107, 108 wherein a further embodiment of a lift mechanism is employed. An advantage of this embodiment comprises that the expensive production of a head plate 35, 35a can be dispensed with.

The embodiment shown in FIG. 20 of a module 104 includes the bearing block 120 with a bearing bush 124, a fork 130 with a rotary plate 131, two bearing arms. 133, 133', a bearing bolt 136 as well as a roller body 140 with the wheel rim 141, two wheel tires 143, 143' and with a bearing axis supported in the roller body 140 ball bearings 148 in analogy to the embodiment of a module 4, 5, 6, 7, 8 shown in FIG. 4. The embodiment of a module 104 shown in FIG. 20 does not show a head plate in contrast to the embodiment of a module 4, 5, 6, 7, 8 shown in FIG. 4. The bearing bush 124 exhibits groove shaped recesses 82. The projections 86 at the bottom side of the rotary plate 131 belonging thereto in the sense of a lift mechanism are preferably formed (FIG. 22) by the heads of rivets.

FIGS. 21–23 show the fork 130 of FIG. 20 in more detail. FIG. 21 shows a side elevational view and FIG. 22 a further side elevational view rotated by 90 degrees relative to FIG. 21 of the fork 130, whereas FIG. 23 shows a top plane view onto the fork 130. The rotary plate 131 exhibits four projections 86 disposed at the rotary plate 131 and not illustrated in FIG. 21 and FIG. 23. The projections 86 are illustrated with dashed lines in FIG. 22. The rotary plate 131 is furnished with four bore holes 91, 92, 93, 94 forming the corners of square, wherein the bore holes 91, 92, 93, 94 serve for the receiving of rivets, wherein the heads of the rivets form projections 86. A rivet is pressed such into each of the bore holes 91, 92, 93, 94 that the head of the rivet projects downwardly in the direction of the bearing block 20 beyond the rotary plate 131.

FIGS. 24 and 25 show in more detail the bearing block 120. The bearing block 120 exhibits an H-shaped attachment base 121, 121' seen in a top view (FIG. 6), wherein the attachment base 121, 121' is essentially identical with the attachment base 20 shown in FIG. 6 and a vertically aligned bearing bush 124, which bearing bush 124 exhibits essentially the shape of a hollow cylinder. The wall of the bearing bush 124 exhibits at its upper front side 125 four radially running groove shaped recesses 82 disposed staggered by in each case by 90 degrees relative to the axis of the bearing bush 124.

The orientation of the bore holes 91, 92, 93, 94 (FIG. 23) is elected such relative to the recesses 82 that each of the rivets 86 rests on the bearing bush 124 in the region of the bottom of one of the recesses 82, in case the fork 130 is disposed in a straight out position. In this case each rivet 86 engages such into a recess 82 that the fork 130 is disposed in the lowest possible position.

If the fork 130 however is disposed in deflection position, then the rivets 86 do not engage into the recesses 82 such that in the deflection position the complete fork 130 is lifted relative to its position in straight out position according to the present invention. The projections 86 and the recesses 82 therefore form a lift mechanism according to the invention, wherein the lift mechanism necessarily becomes effective by the swiveling of the fork 130 relative to the bearing block 120 from the straight out position into the deflection position.

Threaded screws with a round head and held by nuts are employed instead of the rivets according to an embodiment (not shown), wherein the round heads of the screws protrude downwardly from the rotary plate 131 and serve as projections 86. An advantage of this embodiment comprises that the screws upon wear of their heads can be easily exchanged with small expenditure. A further advantage of this embodiment comprises that the screws can be exchanged against such screws having a smaller or flatter head with little expenditure, in case the lesser lift stroke is desired.

List of Reference Numerals

| | |
|---|---|
| 1 | main conveyor |
| 2 | lateral conveyor |
| 3 | switch |
| 4, 5, 6, 7, 8, 104 | modul |
| 9 | coupling rod |
| 10 | transport goods |
| 11 | bottom side of 35 |
| 12 | bottom side of 35a |
| 13, 14 | bore holes in 38 |
| 15, 15a | web |
| 20 | bearing block |
| 21,21' 121, 121' | attachment base |
| 22', 22", 22''' | screw holes of 20 |
| 23,123 | cross web of 20 |
| 24,24a | bearing bush of 20 |
| 124 | bearing bush of 120 |
| 25,125 | upper front face of the wall of 24, 124 |
| 26 | plane upper front face of the wall of 24a |
| 27 | bearing bore hole of 24 |
| 28 | hinge bore hole of 38 |
| 29, 29' | arm of 38 |
| 30, 130 | fork |
| 31, 131 | rotary plate of 30, 130 |
| 31a | recesses of 31 |
| 32 | upper side of 31 |

-continued

| | |
|---|---|
| 33, 33', 133, 133' | bearing arms on 31, 131 |
| 33a | bore hole in 33, 33' |
| 34 | bottom side of 31 |
| 35, 35a | head plate |
| 36 | bearing bolt |
| 37, 37', 37", 37'" | bore holes in 31 |
| 38 | lever |
| 38a | recess in 38 |
| 39 | apex region of 38 |
| 40, 140 | roller body |
| 41, 141 | wheel rim of 40, 140 |
| 42, 42' | wheel rim bed of 41 |
| 43, 43', 143, 143' | wheel tires of 40, 140 |
| 44 | hub bore hole of 41 |
| 45 | bearing shaft |
| 46 | pulley |
| 47 | drive belt |
| 48 | ball bearing |
| 50 | drive shaft |
| 51 | cheek of 1 |
| 52, 52a | support console |
| 53, 54, 55, 56, 57, | articulated brackets of 9 |
| 58 | pneumatic cylinder |
| 59 | horizontal axe of 40 |
| 63 | canal between 38 and 31 |
| 64 | vertical axis |
| 65, 66 | recesses in 15 |
| 65a, 66a | recesses in 15a |
| 72 | groove shaped recess |
| 76 | projections on 25 |
| 82 | groove shaped recess |
| 86 | projections on 131 |
| 91, 92, 93, 94 | bore holes 13s |
| 101 | main conveyor rollers or cylinders |
| 102 | lateral conveyor rollers or cylinders |

What is claimed is:

1. Switchboard transport system in particular for a gravity roller table which is switchable between a straight out position and a deflection position for deflecting of transport goods from a main conveyor to a lateral conveyor branching from the main conveyor, comprising a group of roller bodies with horizontally running rotation axes, wherein the roller bodies (40, 140) are disposed rotatable around their rotation axes at in each case a fork (30, 130) and wherein each fork (30, 130) exhibits a bearing bolt (36) disposed vertical downwardly projecting from the fork (30, 130), which bearing bolt (36) is introduced from the top into a vertically disposed, on the top open bearing bush (24, 24a, 124) of a bearing block (20, 120) not participating in the swivel motion, such that the fork (30, 130) is swivelable supported between a first position and a second position around the vertical swivel axis in the bearing block (20, 120), wherein the switch (3) is disposed in the straight out position in case the forks (30, 130) are disposed in each case in the first position and wherein the switch (3) is disposed in the deflection position, in case the forks (30, 130) are disposed in each case in the second position, wherein the forks (30, 130) are lifted such by the lift mechanism during the swiveling from the first position into the second position such that the transport goods (10) are at least partially lifted relative to the transport system by at least one of the roller bodies (40, 140) upon passage of the switch (3) characterized in that either the fork (30) exhibits a head plate (35) exhibiting recesses (72) at its lower side (11) and is disposed in the end region of the bearing bolt (36) and wherein the wall of the bearing bush (24) is limited on its top by an upper front face (25) exhibiting projections (76), wherein the bearing bolt (36) is introduced from the top into the bearing bush (24) for a swivelable support of the fork (30) around a vertical axis and wherein the lower side (11) rests on the upper front face (25), wherein the projections (76) and the recesses (72) are disposed such that the projections (76) engage into the recesses (72) in the first position of the fork (30) and do not engage in the second position of the fork (30) into the recesses (72) such that the fork (30) is disposed in the second position in a lifted position relative to its position in the first position by the depth of the recesses (72) or the height of the projections (76), or the fork (30) exhibits a head plate (35) disposed in the upper end region of the bearing bolt (36), wherein the lower side (12) of the head plate (35a) is plane and inclined relative to a horizontal, and wherein the wall of the bearing bush (24a) is limited on the top by a plane upper front face (26) inclined relative to a horizontal, wherein the bearing bolt (36) is introduced from the top into the bearing bush (24) for a swivelable support of the fork (30) around the vertical axis and wherein the lower side (12) rests on the upper front face (26), wherein the spatial position of the lower side (12) and of the upper front face (26) are oriented such relative to each other that the fork (30) is disposed in the second position in a lifted position relative to its position in the first position, or the bearing block (120) exhibits recesses (82) and the fork (130) exhibits a rotary plate (131) with projections (86), wherein the rotary plate (131) rests on the upper front face of the bearing bush (124) and wherein the projections (86) engage into the recesses (82) in the first position of the fork (130) and wherein the projections (86) in the second position of the fork (130) rest on the bearing block (120) outside of the recesses (82) such that the fork (130) is disposed in the second position in a lifted position relative to the position in the first position by the depth of the recesses (82) or by the height of the projections (86).

2. Switch according to claim 1 characterized in that the projections (72, 86) are formed by the heads of rivets or screws.

3. Switch according to claim 1 or claim 2, characterized in that the forks (30, 130) exhibit each one rotary plate (31, 131) with two vertically projecting bearing arms (33, 33', 133, 133'), wherein in each case a roller body (40, 140) is rotatably received between the bearing arms (33, 33', 133, 133').

4. Switch according to claim 1 characterized in that the forks (30, 130) are connected hinged to at least one common coupling rod (9) for coupling of their swivel motions.

5. Switch according to claim 4 characterized in that the rotary plates (31, 131) are connected to the coupling rod (9) through a lever (38) projecting about horizontally.

6. Switch according to claim 1 characterized in that the roller body (40, 140) is formed as a wheel rim (41, 141), wherein at least one wheel tire (43, 43', 143, 143') surrounding the wheel rim (41, 141) like a tire and co-forming the running face for the transport goods (10) is disposed at the wheel rim (41, 141).

7. Switch according to claim 1 characterized in that the roller body (40, 140) exhibits a pulley (46) recessed relative to the outer faces of the wheel tires (43,43', 143,143').

8. Switch according to claim 6 or 7 characterized in that the wheel rim (41, 141) exhibits to wheel rim beds (42, 42') disposed at a distance from its other, wherein the wheel tire (43,43', 143,143') is tire-like surrounding the wheel rim (41,141) and co-forming the running face for the transport goods (10), wherein the pulley (46) is disposed between the wheel tires (43, 43', 143, 143').

9. Switch according to claim 1 characterized in that the bearing blocks (20) are disposed at a distance next to each other on a support console (52, 52a) extending perpendicular to the transport direction of the main conveyor (1).

10. Switch according to claim 1 characterized in that the roller body (40, 140) are driven.

11. Switch according to claim 10 characterized in that the drive of the roller bodies (40, 140) is performed by in each case one drive belt (47) led around the pulley (46).

12. Switch according to claim 10 or 11 characterized in that the roller bodies (40, 140) are driven by a joint drive shaft (50).

13. Switch according to claim 5 or 11 characterized in that the rotary plate (31, 131) exhibits a recess (31a) disposed toward the lever (38) and the lever (38) exhibits a recess (38a) disposed toward the rotary plate (31, 131), wherein the drive belt (47) is led through the intermediate space between the rotary plate (31, 131) and the lever (38) formed based on the recesses (31a, 38a).

14. Switch according to claim 1 characterized in that the field of switches is formed with the aid of a plurality of roller bodies (40, 140), which in each case are supported rotatably by way of a fork (30, 130) swivelably supported around the vertical axis.

15. Switchboard transport system in particular for a gravity roller table which is switchable between a straight out position and a deflection position for deflecting of transport goods from a main conveyor to a lateral conveyor branching from the main conveyor, comprising a group of roller bodies with horizontally running rotation axes, wherein the roller bodies (40, 140) are disposed rotatable around their rotation axes at in each case a fork (30, 130) and wherein each fork (30, 130) exhibits a bearing bolt ' (36) disposed vertical downwardly projecting from the fork (30, 130), which bearing bolt (36) is introduced from the top into a vertically disposed, on the top open bearing bush (24, 24a, 124) of a bearing block (20, 120) not participating in the swivel motion, such that the fork (30, 130) is swivelable supported between a first position and a second position around the vertical swivel axis in the bearing block (20, 120), wherein the switch (3) is disposed in the straight out position in case the forks (30, 130) are disposed in each case in the first position and wherein the switch (3) is disposed in the deflection position, in case the forks (30, 130) are disposed in each case in the second position, wherein the forks (30, 130) are lifted such by the lift mechanism during the swiveling from the first position into the second position such that the transport goods (10) are at least partially lifted relative to the transport system by at least one of the roller bodies (40, 140) upon passage of the switch (3) characterized in that the fork (30) exhibits a head plate (35) exhibiting recesses (72) at its lower side (11) and is disposed in the end region of the bearing bolt (36) and wherein the wall of the bearing bush (24) is limited on its top by an upper front face (25) exhibiting projections (76), wherein the bearing bolt (36) is introduced from the top into the bearing bush (24) for a swivelable support of the fork (30) around a vertical axis and wherein the lower side (11) rests on the upper front face (25), wherein the projections (76) and the recesses (72) are disposed such that the projections (76) engage into the recesses (72) in the first position of the fork (30) and do not engage in the second position of the fork (30) into the recesses (72) such that the fork (30) is disposed in the second position in a lifted position relative to its position in the first position by the depth of the recesses (72) or the height of the projections (76).

16. Switchboard transport system in particular for a gravity roller table which is switchable between a straight out position and a deflection position for deflecting of transport goods from a main conveyor to a lateral conveyor branching from the main conveyor, comprising a group of roller bodies with horizontally running rotation axes, wherein the roller bodies (40, 140) are disposed rotatable around their rotation axes at in each case a fork (30, 130) and wherein each fork (30, 130) exhibits a bearing bolt (36) disposed vertical downwardly projecting from the fork (30, 130), which bearing bolt (36) is introduced from the top into a vertically disposed, on the top open bearing bush (24, 24a, 124) of a bearing block (20, 120) not participating in the swivel motion, such that the fork (30, 130) is swivelable supported between a first position and a second position around the vertical swivel axis in the bearing block (20, 120), wherein the switch (3) is disposed in the straight out position in case the forks (30, 130) are disposed in each case in the first position and wherein the switch (3) is disposed in the deflection position, in case the forks (30, 130) are disposed in each case in the second position, wherein the forks (30, 130) are lifted such by the lift mechanism during the swiveling from the first position into the second position such that the transport goods (10) are at least partially lifted relative to the transport system by at least one of the roller bodies (40, 140) upon passage of the switch (3) characterized in that the fork (30) exhibits a head plate (35) disposed in the upper end region of the bearing bolt (36), wherein the lower side (12) of the head plate (35a) is plane and inclined relative to a horizontal, and wherein the wall of the bearing bush (24a) is limited on the top by a plane upper front face (26) inclined relative to a horizontal, wherein the bearing bolt (36) is introduced from the top into the bearing bush (24) for a swivelable support of the fork (30) around the vertical axis and wherein the lower side (12) rests on the upper front face (26), wherein the spatial position of the lower side (12) and of the upper front face (26) are oriented such relative to each other that the fork (30) is disposed in the second position in a lifted position relative to its position in the first position.

17. Switchboard transport system in particular for a gravity roller table which is switchable between a straight out position and a deflection position for deflecting of transport goods from a main conveyor to a lateral conveyor branching from the main conveyor, comprising a group or roller bodies with horizontally running rotation axes, wherein the roller bodies (40, 140) are disposed rotatable around their rotation axes at in each case a fork (30, 130) and wherein each fork (30, 130) exhibits a bearing bolt (36) disposed vertical downwardly projecting from the fork (30, 130), which bearing bolt (36) is introduced from the top into a vertically disposed, on the top open bearing bush (24,24a, 124) of a bearing block (20, 120) not participating in the swivel motion, such that the fork (30, 130) is swivelable supported between a first position and a second position around the vertical swivel axis in the bearing block (20, 120), wherein the switch (3) is disposed in the straight out position in case the forks (30, 130) are disposed in each case in the first position and wherein the switch (3) is disposed in the deflection position, in case the forks (30, 130) are disposed in each case in the second position, wherein the forks (30, 130) are lifted such by the lift mechanism during the swiveling from the first position into the second position such that the transport goods (10) are at least partially lifted relative to the transport system by at least one of the roller bodies (40, 140) upon passage of the switch (3) characterized in that the bearing block (120) exhibits recesses (82) and the fork (130) exhibits a rotary plate (131) with projections (86), wherein the rotary plate (131) rests on the upper front face of the bearing bush (124) and wherein the projections (86) engage into the recesses (82) in the first position of the fork (130) and wherein the projections (86) in the second position of the fork (130) rest on the bearing block (120) outside of the recesses (82) such that the fork (130) is disposed in the second position in a lifted position relative to the position in the first position by the depth of the recesses (82) or by the height of the projections (86).

18. A switchboard transport system comprising a bearing block (20, 120);

a vertically disposed, on the top open bearing bush (24,24a, 124) formed at the bearing block (20, 120);

a plurality of forks (30, 130), wherein each one of the plurality of forks (30, 130) exhibits a bearing bolt (36) disposed vertical downwardly projecting from each one of the plurality of forks (30, 130) and which bearing bolt (36) is introduced from the top into the vertically disposed, on the top open bearing bush (24,24a, 124) of the bearing block (20, 120) not participating in a swivel motion, such that the fork (30, 130) is swivelable supported between a first position and a second position around the vertical swivel axis in the bearing block (20, 120);

a group of roller bodies (40, 140) having horizontally disposed rotation axes, wherein the roller bodies (40, 140) are disposed rotatable around their rotation axes at in each case one of the plurality of forks (30, 130);

a switch (3) disposed in a straight out position in case the forks (30, 130) are disposed in each case in the first position and said switch (3) disposed in a deflection position, in case the forks (30, 130) are disposed in each case in the second position, wherein the forks (30, 130) are lifted such by the lift mechanism during a swiveling from the first position into the second position such that the transport goods (10) are at least partially lifted relative to the transport system by at least one of the roller bodies (40, 140) upon passage of the switch (3); and a head plate (35) exhibiting recesses (72) at its lower side (11) and is disposed in the end region of the bearing bolt (36), wherein the head plate (35) is furnished to the fork (30) and wherein the wall of the bearing bush (24) is limited on its top by an upper front face (25) exhibiting projections (76), wherein the bearing bolt (36) is introduced from the top into the bearing bush (24) for a swivelable support of the fork (30) around a vertical axis and wherein the lower side (11) rests on the upper front face (25), wherein the projections (76) and the recesses (72) are disposed such that the projections (76) engage into the recesses (72) in the first position of the fork (30) and do not engage in the second position of the fork (30) into the recesses (72) such that the fork (30) is disposed in the second position in a lifted position relative to its position in the first position by the depth of the recesses (72) or the height of the projections (76);

wherein the formed switchboard transport system is switchable between a straight out position and a deflection position for deflecting of transport goods from a main conveyor to a lateral conveyor branching from the main conveyor.

19. A switchboard transport system comprising a bearing block (20, 120);

a vertically disposed, on the top open bearing bush (24,24a, 124) formed at the bearing block (20, 120);

a plurality of forks (30, 130), wherein each one of the plurality of forks (30, 130) exhibits a bearing bolt (36) disposed vertical downwardly projecting from each one of the plurality of forks (30, 130) and which bearing bolt (36) is introduced from the top into the vertically disposed, on the top open bearing bush (24,24a, 124) of the bearing block (20, 120) not participating in a swivel motion, such that the fork (30, 130) is swivelable supported between a first position and a second position around the vertical swivel axis in the bearing block (20, 120);

a group of roller bodies (40, 140) having horizontally disposed rotation axes, wherein the roller bodies (40, 140) are disposed rotatable around their rotation axes at in each case one of the plurality of forks (30, 130);

a switch (3) disposed in a straight out position in case the forks (30, 130) are disposed in each case in the first position and said switch (3) disposed in a deflection position, in case the forks (30, 130) are disposed in each case in the second position, wherein the forks (30, 130) are lifted such by the lift mechanism during a swiveling from the first position into the second position such that the transport goods (10) are at least partially lifted relative to the transport system by at least one of the roller bodies (40, 140) upon passage of the switch (3); and a head plate (35) disposed in the upper end region of the bearing bolt (36), wherein the head plate (35) is furnished to the fork (30), wherein the lower side (12) of the head plate (35a) is plane and inclined relative to a horizontal, and wherein the wall of the bearing bush (24a) is limited on the top by a plane upper front face (26) inclined relative to a horizontal, wherein the bearing bolt (36) is introduced from the top into the bearing bush (24) for a swivelable support of the fork (30) around the vertical axis and wherein the lower side (12) rests on the upper front face (26), wherein the spatial position of the lower side (12) and of the upper front face (26) are oriented such relative to each other that the fork (30) is disposed in the second position in a lifted position relative to its position in the first position;

wherein the formed switchboard transport system is switchable between a straight out position and a deflection position for deflecting of transport goods from a main conveyor to a lateral conveyor branching from the main conveyor.

20. A switchboard transport system comprising a bearing block (20, 120);

a vertically disposed, on the top open bearing bush (24, 24a, 124) formed at the bearing block (20, 120);

a plurality of forks (30, 130), wherein each one of the plurality of forks (30, 130) exhibits a bearing bolt (36) disposed vertical downwardly projecting from each one of the plurality of forks (30, 130) and which bearing bolt (36) is introduced from the top into the vertically disposed, on the top open bearing bush (24,24a, 124) of the bearing block (20, 120) not participating in a swivel motion, such that the fork (30, 130) is swivelable supported between a first position and a second position around the vertical swivel axis in the bearing block (20, 120);

a group of roller bodies (40, 140) having horizontally disposed rotation axes, wherein the roller bodies (40, 140) are disposed rotatable around their rotation axes at in each case one of the plurality of forks (30, 130);

a switch (3) disposed in a straight out position in case the forks (30, 130) are disposed in each case in the first position and said switch (3) disposed in a deflection position, in case the forks (30, 130) are disposed in each case in the second position, wherein the forks (30, 130) are lifted such by the lift mechanism during a swiveling from the first position into the second position such that the transport goods (10) are at least partially lifted relative to the transport system by at least one of the roller bodies (40, 140) upon passage of the switch (3); and a rotary plate (131) with projections (86), wherein the bearing block (120) exhibits recesses (82) and the fork (130) is furnished with the rotary plate (131), wherein the rotary plate (131) rests on an upper front face of the bearing bush (124) and wherein the projections (86) engage into the recesses (82) in the first position of the fork (130) and wherein the projections (86) in the second position of the fork (130) rest on the bearing block (120) outside of the recesses (82) such that the fork (130) is disposed in the second position in a lifted position relative to the position in the first position by the depth of the recesses (82) or by the height of the projections (86);

wherein the formed switchboard transport system is switchable between a straight out position and a deflection position for deflecting of transport goods from a main conveyor to a lateral conveyor branching from the main conveyor.

* * * * *